United States Patent [19]
Fischer, Jr. et al.

[11] 3,732,501
[45] May 8, 1973

[54] REDUNDANT OPERATIONAL AMPLIFIER CIRCUIT FOR SERVO CONTROL SYSTEMS

[75] Inventors: William C. Fischer, Jr., Monroe, Conn.; Frank W. Symons, Jr., Pennsylvania Furnace, Pa.

[73] Assignee: United Aircraft Corporation, East Hartford, Conn.

[22] Filed: Sept. 27, 1971

[21] Appl. No.: 183,925

[52] U.S. Cl. .................... 330/1 A, 318/564, 330/84, 330/124 D
[51] Int. Cl. ............................................... H03f 3/68
[58] Field of Search .................... 330/84, 1 A, 124 D, 330/105; 318/564; 307/219; 328/224

[56] References Cited

UNITED STATES PATENTS

| | | | |
|---|---|---|---|
| 3,489,889 | 1/1970 | Escobosa | 318/564 X |
| 2,536,651 | 1/1951 | Merhaut | 330/84 |

Primary Examiner—Roy Lake
Assistant Examiner—James B. Mullins
Attorney—Donald F. Bradley

[57] ABSTRACT

A redundant type servo valve control system is disclosed which employs a circuit comprising two simultaneously operating control loop channels for protecting against a failure in the control channel. Each channel includes an operational amplifier having one input terminal grounded and the other input terminal connected to a substantially identical input source of error signal. The output from each operational amplifier is fed back to its error signal input terminal through a servo valve load which is common to both channels. Only one feedback loop can be satisfied, so that one of the amplifiers is saturated and the other operates linearly to provide an output in such a manner as to control the amount of the output current from both amplifiers which flows through the servo valve load.

4 Claims, 2 Drawing Figures

PATENTED MAY 8 1973 3,732,501

INVENTORS
WILLIAM C. FISCHER, JR.
FRANK W. SYMONS, JR.

Donald J. Bradley
BY              ATTORNEY

REDUNDANT OPERATIONAL AMPLIFIER CIRCUIT FOR SERVO CONTROL SYSTEMS

BACKGROUND OF THE INVENTION

1. Field of the Invention

This invention relates to a control system for a controlled device, and particularly to an electronic circuit having two inputs from two redundant control channels for protecting against a failure in the control channel. More specifically, this invention relates to a novel redundant operational amplifier circuit having two substantially identical inputs and a single output for controlling a single servo valve, a failure in either input having no detrimental effect on the output to the servo.

2. Description of the Prior Art

In servo operated control systems, it is well known to add redundant channels to prevent a failure in the control loop from having a catastrophic effect upon the output. For example, automatic flight control systems in aircraft in which a control surface is responsive to changes in flight attitude as measured by gyros, accelerometers, transducers, etc., will commonly contain redundant control channels so that a failure such as a short circuit or open circuit will not cause the control surface to oscillate or to lock in an extreme position, thereby adversely affecting the safety of the aircraft. The redundancy can take many forms, such as a back-up servo channel which is activated when a failure is sensed in the primary channel, or simultaneously operating redundant channels in which the outputs are compared and the controlled device actuated only when the multiple outputs agree, or even multiple control loops in which the outputs are averaged. Control logic is often used to determine when a control channel has failed, or to select one of a plurality of control channels.

The present invention is an improvement which eliminates the need for control logic in many applications, and permits the use of two redundant control channels with a single servo amplifier circuit. The two control channels operate simultaneously, each providing an input to the single servo amplifier circuit. The single output from the circuit is substantially unaffected by a failure in one of the control channels, thereby preventing the servo controlled device from responding to a failure or from erratic operation. For a failure in one of the control channels which produces an input signal to the circuit of the same polarity as the input signal from the normally operating control channel, the system will continue to operate in normal fashion. For a failure in one of the control channels which produces an input signal to the circuit of opposite polarity from the input signal produced by the normally operating control channel, the circuit will null and cause the controlled element to return to its null position.

SUMMARY OF THE INVENTION

In accordance with the invention, two standard operational amplifier circuits having feedback loops have been combined with a single servo valve load being common to both feedback loops. Each operational amplifier has an input signal from substantially identical channels applied thereto. Because the two operational amplifiers and their feedback loops are not identical due to normal design tolerances, only one feedback loop can be satisfied, and one of the amplifiers will be saturated and the other will operate linearly. Any changes in one of the input signals such as would be caused by a failure in one channel will have no effect on the current flow through the servo valve load if the change is of the same polarity as the normal input, since one amplifier is saturated even during normal operation. If the failure causes one input signal to change polarity, both amplifiers will saturate and the current flow through the servo valve load will be at null.

DESCRIPTION OF THE PREFERRED EMBODIMENT

Figure 1:
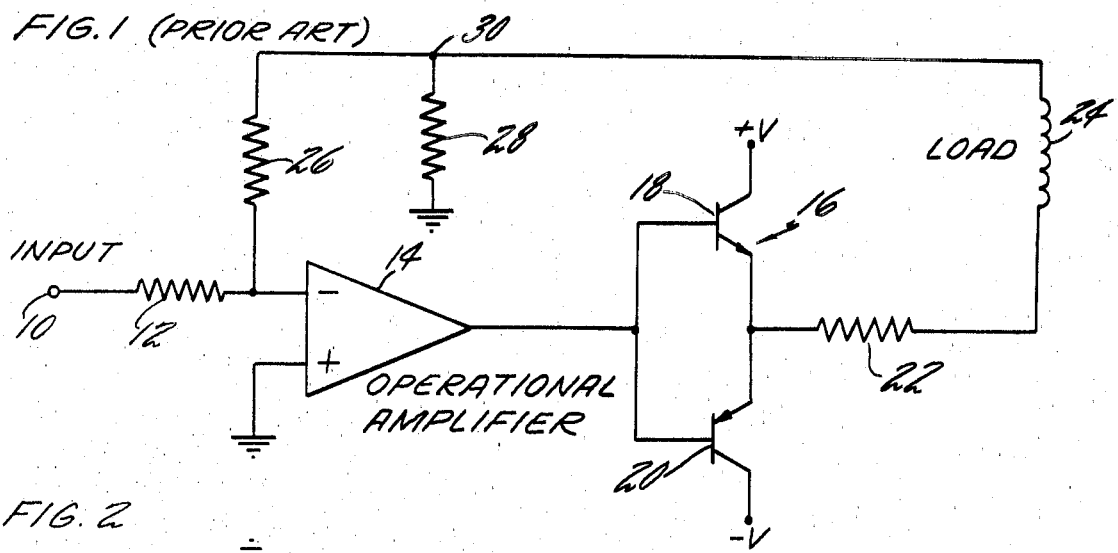
FIG. 1 is a schematic of a standard prior art operational amplifier circuit having a feedback loop and a servo valve load.
Figure 2:
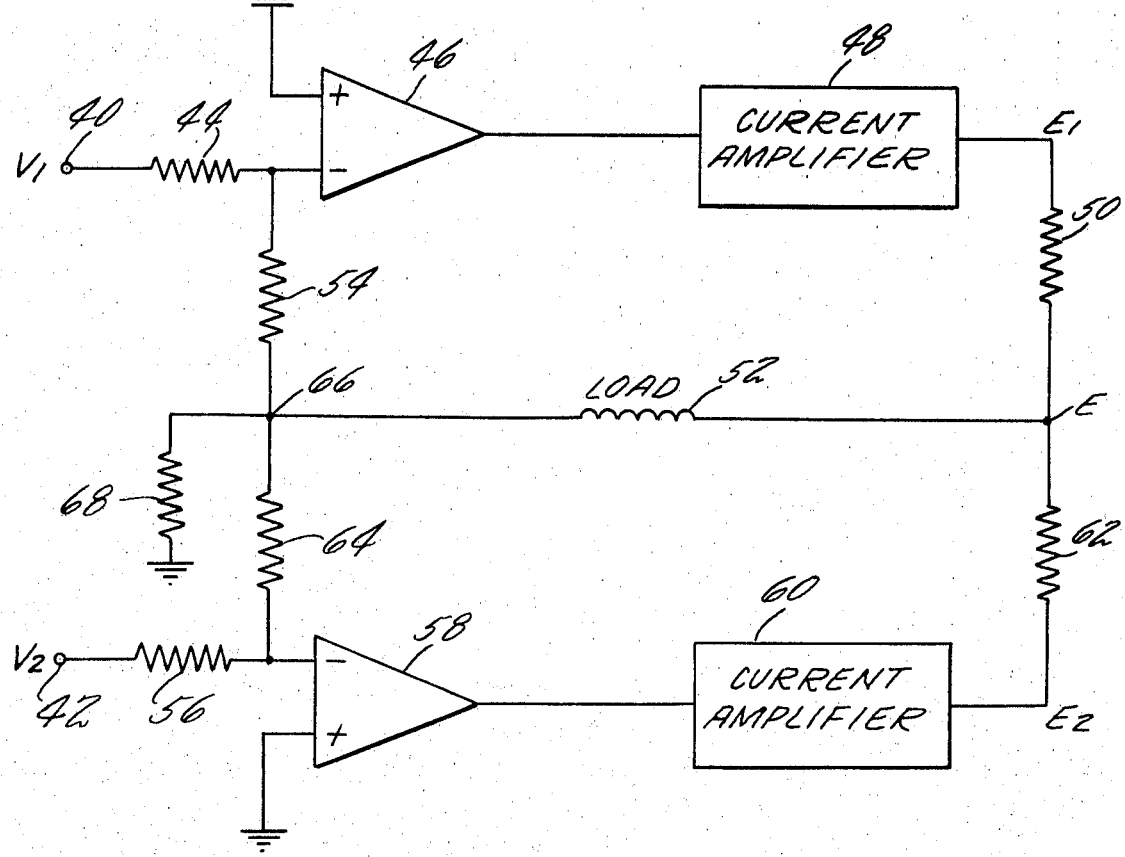
FIG. 2 is a schematic of the circuit of this invention in which two of the standard operational amplifier circuits of FIG. 1 have been combined with a single servo valve load common to the feedback loops of both operational amplifiers.

Referring particularly to FIG. 1, there is shown a standard operational amplifier circuit which is known in the prior art. For purposes of description, the circuit may for example be connected in an autopilot system for an aircraft or helicopter, with the input signal to the operational amplifier circuit being an error signal caused by deviation in the attitude of the aircraft from a desired value, and with the output from the circuit being connected to a servo valve which is then further connected to a control surface of the aircraft. Other uses for the circuit of FIG. 1, and the improved circuit of FIG. 2, are well known to those skilled in the art.

The input error signal at terminal 10 is fed through resistor 12 to one terminal of operational amplifier 14. The other terminal of the operational amplifier 14 is grounded. The output from amplifier 14 is fed to a current amplifier network 16 which consists of transistors 18 and 20 connected in a well-known common emitter configuration. The current amplifier 16 provides a current boost to the output from operational amplifier 14, and may not be required in some circuit configurations.

The output from the current amplifier 16 is fed through a current limiting resistor 22 to a load 24 which may be a controller such as a servo valve coil.

The load current is then fed back to the input terminal of operational amplifier through feedback resistor 26. An attenuating resistor 28 is connected across the feedback path. The purpose of the attenuating resistor 28 is to scale the value of the current fed back to the input to operational amplifier 14 to the proper value. If the operational amplifier 14 provides sufficient current to drive load 24, both current amplifier 16 and attenuating resistor 28 may be omitted.

In order to satisfy the operational amplifier feedback loop requirements, the current through resistor 12 must equal the current through resistor 26. If the value of resistor 12 is the same as that of resistor 26, the voltage at input terminal 10 must equal the voltage at terminal 30.

The current through the load 24 must be equal to the currents flowing through resistor 26 plus the current flowing through resistor 28. If resistor 26 is very large, such as 1000 times greater than the value of resistor 28, the current flowing through resistor 26 can be neglected, and the current through load 24 would be equal to the current flowing through resistor 28. The current through resistor 28 is determined only by the voltage developed at terminal 30 and the resistor 28. The current through the servo valve 24 must equal the current through resistor 28 regardless of the impedance of the load. This is characteristic of an ideal current source.

The feedback loop of the operational amplifier is acting to null the input error signal. When null occurs, the output from the operational amplifier is zero, and the system is at rest.

The circuit of FIG. 1 provides adequate operation as the amplifier stage in a servo channel. However, when redundancy is required, additional circuit logic is also required to determine which of the redundant circuits, if any, is operating in a failure mode.

The circuit of FIG. 2 overcomes the disadvantages of a servo system in which the circuit of FIG. 1 is incorporated. Two of the operational amplifier circuits of FIG. 1 are combined in such a manner that a single load appears in both feedback paths.

Referring to FIG. 2, two error signals from two similar sources are connected to terminals 40 and 42, the error signals being shown as $V_1$ and $V_2$. During normal operation, $V_1$ and $V_2$ will be identical or nearly so depending on circuit tolerances.

The voltage $V_1$ at terminal 40 is fed through resistor 44 to operational amplifier 46. The output from the amplifier is fed through current amplifier 48, if required, and then through current limiting resistor 50 and across load 52. The current is then fed back to the input terminal of operational amplifier 46 through resistor 54.

Error signal $V_2$ at terminal 42 is fed through resistor 56 to operational amplifier 58. The output from the amplifier is fed through current amplifier 60, if required, and resistor 62, through load 52 and back to the input of the amplifier through resistor 64. Attenuating resistor 68 is connected between junction 66 and ground. The load 52 thus appears in the feedback loop of both operational amplifier circuits.

With the circuit configuration as shown in FIG. 2, the two nearly identical inputs $V_1$ and $V_2$ will both control the voltage at junction 66. Both operational amplifiers require the voltage at junction 66 to be equal to the input error voltage. As with the circuit of FIG. 1, the gain through resistor 68 is the same as the gain through load 52.

Control of the voltage at junction 66 is performed in a different manner in the circuit of FIG. 2 than in the circuit of FIG. 1. Since there are two feedback loops in FIG. 2 to be satisfied, and only one load through which to supply current, control cannot be performed as in the single circuit configuration of FIG. 1. Because of design tolerances and differences in equipment, only one feedback loop can be satisfied. The two amplifiers must therefore adapt their output so that the voltage at junction 66 is controlled in such a manner that only one feedback loop is satisfied. The result is that one of the amplifiers is saturated, while the other operates in a linear fashion. The amplifier operating linearly provides an output in such a manner as to control how much of the output current from the saturated amplifier flows through the load, and therefore through resistor 68.

Assuming that both operational amplifiers are of identical construction and assuming that the saturated voltage is +10 volts, and assuming also that operational amplifier 46 is the saturated amplifier (therefore +10V) during the time when both inputs $V_1$ and $V_2$ are commanding zero current the output from operational amplifier 58 which appears at $E_2$ will be −10 volts resulting in zero volts at E. There will then be no current through the load 52, and the voltage at junction 66 will also be zero.

If some finite voltage is applied to both inputs $V_1$ and $V_2$, the voltage at $E_2$ will diminish in magnitude in order to allow the proper current to flow through the load 52.

The role that is played by each amplifier is determined by the physical characteristics of each and by the fact that no two operational amplifiers have identical characteristics. The loop through load 52 will then adapt itself to provide the proper current through the load.

Assume now that a malfunction has occurred in one of the control loops, and that the voltage at junction $V_1$ is different from the error voltage at junction $V_2$. There are two possible configurations. The first condition is when the two control loops command error signals of opposite polarity due to a malfunction in one loop. This condition is one that cannot be satisfied by the two amplifiers working together. Therefore, each tries to satisfy its input condition by attempting to develop the correct voltage at junction 66. In so doing, both amplifiers 46 and 58 saturate in opposite polarities resulting in a net current of zero through the load 52.

The second condition is the event that the two control loops are operating in the same polarity when a failure occurs, and one of the error signals becomes very large in the same polarity. For example, $V_2$ is at its proper level, while $V_1$ has a large voltage of the same polarity because of a malfunction in the control loop of $V_1$. A large $V_1$ input would cause amplifier 46 to saturate. Assume that during normal circuit operation, amplifier 46 is already saturated whether or not $V_1$ is at a large value. Thus, as far as the joint feedback loops are concerned, the circuit is functioning properly, and the current through the load 52 follows the command of the lower error signal $V_2$.

If the large error signal had occurred at $V_2$ rather than at $V_1$, the two amplifiers would instantaneously swap roles. Amplifier 58 would then saturate, and amplifier 46 would control the current through the load 52 as in normal operation. The only time that a change in the load current would occur is when one of the input error signals becomes of the opposite polarity from the other, at which time a net current of zero would appear across the load as explained previously.

Thus, regardless of any failure which may occur in one of the control loops, the most radical change that could occur is that the current through the load will be nulled. If this occurs, the controlled device which is driven by load 52 such as the aircraft control surface will return to its normal position and would not lock in an extreme position. The nulling will occur when one of the error signals is of opposite polarity from the other. If both control loops are working around null and a failure occurs which produces a signal in one channel of a high magnitude of the same polarity, the control element will not respond since no change in the load current will occur.

While the present invention has been described in its preferred embodiment, it will be apparent to those skilled in the art that changes may be made in the circuit configuration and the arrangement of parts without departing from the scope of the invention as hereinafter claimed.

We claim:

1. In a control system for a controlled device in which first and second redundant control channels produce respectively first and second error signals for independently controlling said controlled device, said signals being substantially identical during normal operation, the improvement which comprises an amplifier circuit connected between said control channels and said controlled device, said circuit including, a first operational amplifier having a first input terminal connected to receive said first error signal, a first negative feedback circuit connecting the output from said first operational amplifier with said first input terminal, said first feedback circuit including a load for actuating said controlled device, a second operational amplifier having a second input terminal connected to receive said second error signal, and a second negative feedback circuit connecting the output from said second operational amplifier with said second input terminal, said second feedback circuit also including said load whereby the feedback current in each of said first and second feedback circuits passes through said load.

2. A control system as in claim 1 in which said load is a servo valve.

3. A control system as in claim 1 and including a current amplifier connected between each said operational amplifier and said load, and current attenuating means connected between said load and said first and second input terminals.

4. In a control system for a controlled device in which first and second redundant control channels produce respectively first and second error signals for independently controlling said controlled device, said error signals being substantially identical during normal operation, an amplifier circuit connected between said control channels and said controlled device, said amplifier circuit comprising first and second operational amplifiers each having an input terminal and each having a negative feedback loop connecting the output from each amplifier with its respective input terminal, each said feedback loop containing a load common to both feedback paths, said load producing an output signal for actuating said controlled device, the input terminal of each of said operational amplifiers being connected to receive one of said error signals as an input thereto, a deviation between said error signals in which one of said error signals is of a larger magnitude but of the same polarity as said other error signal causing the amplifier circuit to which said larger magnitude error signal is connected to saturate and producing no change in the output signal from said load, a deviation between said error signals in which one of said error signals is of the opposite polarity from said other error signal causing both of said amplifier circuits to saturate and causing the output signal from said load to be zero.

* * * * *